United States Patent
Nito et al.

(10) Patent No.: US 6,932,465 B2
(45) Date of Patent: Aug. 23, 2005

(54) REACTION SOLUTION, SET OF REACTION SOLUTION AND INK, INK JET RECORDING APPARATUS AND IMAGE RECORDING METHOD

(75) Inventors: Yasuhiro Nito, Kanagawa (JP); Shinya Mishina, Kanagawa (JP); Shinichi Hakamada, Kanagawa (JP); Yoichi Takada, Kanagawa (JP); Toshifumi Akasaka, Kanagawa (JP); Masashi Tsujimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/661,969

(22) Filed: Sep. 15, 2003

(65) Prior Publication Data

US 2004/0104986 A1 Jun. 3, 2004

(30) Foreign Application Priority Data

Sep. 17, 2002 (JP) ........................................ 2002-270743

(51) Int. Cl.$^7$ .............................................. B41J 02/01
(52) U.S. Cl. ......................................... 347/96; 347/100
(58) Field of Search ........................... 347/100, 96, 95, 347/101; 106/31.13, 31.6, 31.27; 523/160

(56) References Cited

U.S. PATENT DOCUMENTS

| | | | |
|---|---|---|---|
| 4,694,302 A | | 9/1987 | Hackleman et al. .......... 346/1.1 |
| 5,518,534 A | | 5/1996 | Pearlstine et al. ......... 106/20 R |
| 5,695,820 A | * | 12/1997 | Davis et al. ................. 347/100 |
| 6,020,397 A | * | 2/2000 | Matzinger ..................... 523/160 |
| 6,027,210 A | | 2/2000 | Kurabayashi et al. ........ 347/100 |
| 6,084,619 A | | 7/2000 | Takemoto et al. .............. 347/96 |
| 6,238,045 B1 | | 5/2001 | Ono et al. ...................... 347/96 |
| 6,341,854 B1 | * | 1/2002 | Takemoto ...................... 347/96 |
| 6,435,658 B1 | | 8/2002 | Kato et al. ...................... 347/43 |
| 6,506,239 B1 | | 1/2003 | Osumi et al. .............. 106/31.27 |
| 6,538,047 B1 | * | 3/2003 | Miyabayashi ................. 347/96 |
| 6,572,692 B1 | | 6/2003 | Osumi et al. .............. 106/31.65 |
| 6,582,070 B2 | | 6/2003 | Takada et al. ............... 347/100 |
| 2003/0064206 A1 | * | 4/2003 | Koyano et al. .............. 428/195 |

FOREIGN PATENT DOCUMENTS

| | | | | |
|---|---|---|---|---|
| EP | 0 739 743 A1 | | 10/1996 | |
| EP | 739743 A1 | * | 10/1996 | ............ B41J/02/21 |
| JP | 63-22681 A | | 1/1988 | |
| JP | 63-60783 A | | 3/1988 | |
| JP | 63-299970 A | | 12/1988 | |
| JP | 63-299971 A | | 12/1988 | |
| JP | 64-9279 A | | 1/1989 | |
| JP | 64-63185 A | | 3/1989 | |
| JP | 64-69381 A | | 3/1989 | |
| JP | 06-86142 A | | 3/1994 | |
| JP | 09-118850 A | | 5/1997 | |
| JP | 9-207424 A | | 8/1997 | |
| JP | 11-349877 A | | 12/1999 | |
| JP | 2000-94825 A | | 4/2000 | |
| JP | 2002-079739 | * | 3/2002 | ............ B41J/02/01 |

* cited by examiner

*Primary Examiner*—Manish S. Shah
(74) *Attorney, Agent, or Firm*—Fitzpatrick, Cella, Harper & Scinto

(57) ABSTRACT

A reaction solution to be used for image recording with an ink containing a coloring material in a dissolved or dispersed state in order to achieve a high level of image density with stability, wherein the reaction solution contains a polyvalent metal ion and an organic solvent to destabilize the dissolved or dispersed state of the coloring material in the ink in contact with the ink, has a pH of 2 or higher, and has a buffering action for pH, wherein the buffering action means it can maintain pH variation within the range of 0.5 before and after the addition of 1.0 ml of a 0.1 N aqueous lithium hydroxide solution to 50 ml of the reaction solution.

21 Claims, 4 Drawing Sheets

REACTION SOLUTION, SET OF REACTION SOLUTION AND INK, INK JET RECORDING APPARATUS AND IMAGE RECORDING METHOD

BACKGROUND OF THE INVENTION

1. Field of the Invention

The present invention relates to a reaction solution, a set of the reaction solution and an ink, an inkjet recording apparatus and an image recording method, and particularly relates to a reaction solution to be used with an ink when printing is performed on a recording medium, a set of a reaction solution and an ink, and an image recording method using the same.

2. Related Background Art

Various propositions have been made for the inkjet recording method that uses a liquid other than the ink jet ink for improving image quality, where the liquid is applied to a recording medium before the recording ink is ejected to form an image. There are, for example, a method in which a liquid containing a basic polymer is applied, and then an ink containing an anionic dye is applied (Japanese Patent Application Laid-Open No. S63-60783A), a method in which a liquid containing a chemical species and a liquid containing a compound reactive with the reactive species are mixed on the recording medium (Japanese Patent Application Laid-Open No. S63-22681A), and a method in which a liquid containing an organic compound having two or more cationic groups per molecule is applied, and then an ink containing an anionic dye is applied (Japanese Patent Application Laid-Open No. S63-299971A). Furthermore, there are a method in which an acid liquid containing succinic acid or the like is applied, and then an ink containing an anionic dye is applied (Japanese Patent Application Laid-Open No. S64-09279A), and a method in which a liquid insolubilizing a dye is applied before an ink is applied (Japanese Patent Application Laid-Open Nos. S64-63185A and S64-69381A).

These methods described above are to inhibit feathering of the image, and to improve durability of the image by the precipitation of the dye applied on a recording medium. These methods, however, are not so effective in preventing bleeding between color inks of different colors, since the distribution of the dye precipitated on the recording medium tends to be uneven, which may cause unevenness in the image. Particularly, if normal paper is used as a recording medium, pulp fibers do not receive sufficient application, and this tendency of unevenness sometimes becomes more conspicuous.

On the other hand, there has been proposed, for pigment ink systems, an ink set comprised of an ink containing a pigment dispersion and an ink containing a polyvalent metal in order to alleviate bleeding in a multicolor print (Japanese Patent Application Laid-Open No. H09-118850A). This method, however, has the constraint that the polyvalent metal to be contained in the ink should be compatible with the coloring material in view of ink stability, as well as a problem of insufficient image density.

In order to solve the above-described problems such as uniform image and high image density, various methods have been proposed in which a liquid composition containing a polyvalent metal ion is first applied onto a recording medium, and then printing is carried out with an ink reactive with the liquid composition (Japanese Patent Application Laid-Open Nos. S63-299970A, H06-86142A, H09-207424A, H11-349873A, 2000-94825A and the like).

However, there are still problems that it is difficult to obtain optical density as high as required by recent demand for high image quality, or that image quality may differ from the initial stage to the later stages.

SUMMARY OF THE INVENTION

Thus, the object of the present invention is to provide a reaction solution, a set of a reaction solution and an ink, an inkjet recording apparatus and an image recording method that can achieve a high level of optical density stably from the initial stage to the later stages of use.

The present invention is a reaction solution for use in image recording in conjunction with an ink containing a coloring material in a dissolved or dispersed state, the reaction solution destabilizing the dissolved or dispersed state of the coloring material in the ink in contact with the ink, wherein the reaction solution comprises a polyvalent metal ion and an organic solvent, has a pH of 2 or higher, and has a buffering action for variations in pH, wherein the buffering action means it can maintain pH variation within the range of 0.5 before and after the addition of 1.0 ml of a 0.1 N aqueous lithium hydroxide solution to 50 ml of the reaction solution.

Further, the present invention is a set of an ink and a reaction solution comprising an ink containing a coloring material in a dissolved or dispersed state, and a reaction solution capable of destabilizing the dissolved or dispersed state of the coloring material in the ink in contact with the ink, wherein the reaction solution contains a polyvalent metal ion and an organic solvent, has a pH of 2 or higher, and has a buffering action for variations in pH, wherein the buffering action means it can maintain pH variation within the range of 0.5 before and after the addition of 1.0 ml of a 0.1 N aqueous lithium hydroxide solution to 50 ml of the reaction solution.

Moreover, the present invention is an ink-jet recording apparatus comprising a recording head for discharging an ink containing a coloring material in a dissolved or dispersed state, an ink cartridge having an ink storage unit containing the ink, ink supply means for supplying the ink from the ink cartridge to the recording head, and means for supplying a reaction solution capable of destabilizing the dissolved or dispersed state of the coloring material in the ink in contact with the ink, wherein the reaction solution contains a polyvalent metal ion and an organic solvent, has a pH of 2 or higher, and has a buffering action for variations in pH, wherein the buffering action means it can maintain pH variation within the range of 0.5 before and after the addition of 1.0 ml of a 0.1 N aqueous lithium hydroxide solution to 50 ml of the reaction solution.

Furthermore, the present invention is an image recording method comprising an image recording method comprising a step of coating a recording medium with a reaction solution capable of destabilizing the dissolved or dispersed state of a coloring material in an ink in contact with the ink containing the coloring material in a dissolved or dispersed state, and a step of coating the ink on the recording medium by the inkjet method, wherein the reaction solution contains a polyvalent metal ion and an organic solvent, has a pH of 2 or higher, and has a buffering action for variations in pH, wherein the buffering action means it can maintain pH variation within the range of 0.5 before and after the addition of 1.0 ml of a 0.1 N aqueous lithium hydroxide solution to 50 ml of the reaction solution.

DETAILED DESCRIPTION OF THE PREFERRED EMBODIMENT

Figure 1:
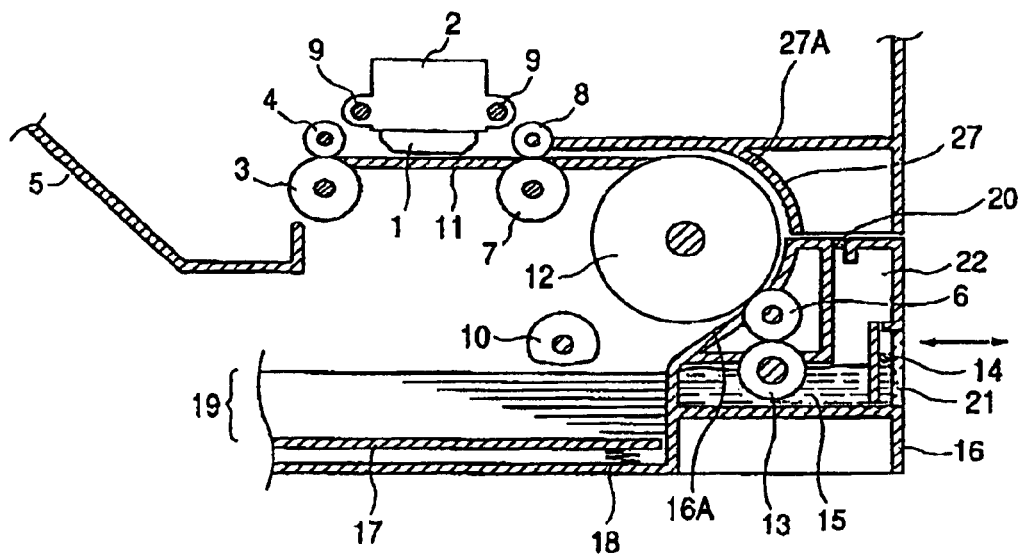
FIG. 1 is a schematic sectional side view showing one example of the inkjet recording apparatus of the present invention.

The reaction solution of the present invention is characterized in that it contains polyvalent metal ions, has a pH of 2 or higher, and it has a buffering action for pH variation. Here, the buffering action means it can maintain the pH within the range of 0.5, more preferably of 0.3 before and after the addition of 1.0 ml of a 0.1 N aqueous lithium hydroxide solution to 50 ml of the reaction solution.

The remarkable effect of the present invention is considered to be due to the following, although this is not substantiated.

When the organic solvent in the reaction solution is oxidized to generate acid groups, these acid groups will react with the polyvalent metal ions, and the counter ion of the polyvalent metal ion (anion) will react with a proton of the acid group to form an acid, whereby the pH of the reaction solution drops. The pH variation will affect the reactivity of the reaction solution, which will change image quality. For example, if the reactivity of the reaction solution is reduced, the coloring material permeates through the recording medium, and therefore a high level of optical density cannot be achieved, or the coloring material reaches close to the backside of the recording medium (so called strike-through of coloring material). The reaction solution of the present invention has a buffering action, thus making it possible to inhibit the reduction in pH as much as possible.

In addition, metal ions resulting from a buffer used for obtaining a buffering action also contribute to destabilization of the coloring material to achieve a high level of optical density that could not be achieved just by using polyvalent metal ions.

It is considered that in the present invention, these functions act synergistically, so that images having a very high level of optical density can be obtained very stably from the initial stage of use of the reaction solution to the later stages of use.

In the present invention, pH is measured at 25° C. by a conventional method.

The present invention will be described in more detail below with a preferred embodiment.

<Reaction Solution>

A reaction solution according to the present invention is used in image recording with an ink containing a coloring material in a dissolved or dispersed state, and it has a function to destabilize the dissolved or dispersed state of the coloring material in the ink. The reaction solution can exhibit an excellent effect especially when it contains a material that destabilizes the dissolved or dispersed state of the coloring material as means for realizing the function.

Destabilization of the dissolved or dispersed state of the coloring material in the ink, in the present invention, means that when an ink and a reaction solution are mixed together, agglomeration or gelling of the coloring material occurs in the mixture (hereinafter referred to as "destabilization of ink"). In the present invention, a polyvalent metal ion is used as a substance to be incorporated in the reaction solution for destabilizing the ink.

<Polyvalent Metal Ions>

Preferable polyvalent metal ions that may be used in the reaction solution according to the present invention include, but are not limited to, bivalent metal ions such as $Ca^{2+}$, $Cu^{2+}$, $Ni^{2+}$, $Mg^{2+}$, $Zn^{2+}$, $Sr^{2+}$ and $Ba^{2+}$, and trivalent metal ions such as $Al^{3+}$, $Fe^{3+}$, $Cr^{3+}$ and $Y^{3+}$, for example. Polyvalent metal ion is added in the reaction solution as a salt of a polyvalent metal. Such a salt is a water soluble metal salt comprising a polyvalent metal ion described above and a counteranion of the polyvalent metal ion. Preferable negative ions for forming salts include but are not limited to, $Cl^-$, $NO^-$, $I^-$, $Br^-$, $ClO_3^-$, $SO_4^{2-}$, $CO_3^{2-}$, $CH_3COO^-$ and $HCOO^-$, for example.

The content of polyvalent metal salt in the present invention is preferably not less than 0.01% and not higher than 20% by weight based on the total amount of reaction solution in view of the effect of the present invention. For full exhibition of ink-destabilizing function, it is preferable that the reaction solution contains 0.01% or more of polyvalent metal salt. On the other hand, as long as the pH of the reaction solution is in the preferred range described previously, the content of the polyvalent metal salt in the reaction solution can be more than 20%. This, however, is not so preferable because the amount of material having a buffering action should be increased, and much improvement in the ink-destabilizing function is not expected with the content of polyvalent metal salt exceeding 20%. The content of polyvalent metal ion is preferably in the range of 0.01% to 10% by weight based on the total amount of reaction solution.

Furthermore, according to studies by the inventors, the pH of the reaction solution more likely varies with time when the salt is a salt of a polyvalent metal with a strong acid such as nitric acid, hydrochloric acid and sulfuric acid. This is because the ion dissociation of the acid produced between the counter-ions of the polyvalent-metal and protons from the acid group becomes high to increase protons in the reaction solution. Thus, in this case, the present invention is particularly effective.

In addition, it has been found that a strong acid salt of a polyvalent metal ion having a higher ink-destabilizing ability causes a greater pH drop. When the inventors studied nitrates of various polyvalent metal ions using an aqueous dispersion of 4 wt % carbon black (dispersant: styrene-acrylic acid, acid value 200, content of dispersant (wt %)/ content of pigment (wt %)=0.2), the ink-destabilizing ability of these salts and the pH drop were both in the order of $Fe^{3+}$, $Y^{3+}$, $Al^{3+}>Cu^{2+}$, $Ca^{2+}>Mg^{2+}$, $Sr^{2+}$. Thus, when a strong acid salt of a polyvalent metal shown above is used, it is preferable that the salt content in the reaction solution is 0.2 wt % or higher with $Fe^{3+}$, $Al^{3+}$ and $Y^{3+}$, 0.5 wt % or higher with Ca24 and Cu24, and 1.0 wt % or higher with $Mg^{2+}$ and $Sr^{2+}$ in view of reactivity with ink.

With a salt of $Mg^{2+}$ or $Sr^{2+}$ having a relatively low ink-destabilizing ability, a larger amount must be contained to achieve the same ink-destabilization as with a salt of $Fe^{3+}$, $Al^{3+}$ or $Y^{3+}$ having a higher destabilizing ability, so that a pH drop with time is more likely to occur.

In the present invention, the polyvalent metal ion is especially preferably $Ca^{2+}$, $Mg^{2+}$, $Sr^{2+}$, $Al^{3+}$ and $Y^{3+}$, in view of reactivity and coloring characteristics, and easiness of handling, and further preferably $Ca^{2+}$. In addition, the negative ion is especially preferably $NO_3^-$ in view of solubility.

<Buffering Action for Variations in pH of Reaction Solution>

As described above, here the buffering action means it can maintain pH variation within the range of 0.5 before and after the addition of 1.0 ml of a 0.1 N aqueous lithium hydroxide solution to 50 ml of the reaction solution.

For the buffering action, a buffer is incorporated in the reaction solution. Specific examples of preferable buffers that can be used include acetic acid salts such as sodium acetate, potassium acetate and lithium acetate; hydrogen phosphates; hydrogen carbonates; and hydrogen multivalent carboxylates such as sodium hydrogen phthalate and potassium hydrogen phthalate. Furthermore, specific examples of multivalent carboxylic acids other than phthalic acid include malonic acid, maleic acid, succinic acid, fumaric acid, itaconic acid, phthalic acid, isophthalic acid, terephthalic acid, adipic acid, sebacic acid, dimmer acid, pyromellitic acid and trimellitic acid. Any well known compounds exerting a buffering action, other than those listed above, can be used in the present invention, as long as they are capable of keeping the pH of the reaction solution within the preferable pH range described above. In the present invention, however, an especially preferable buffer is an acetate buffer because of its buffering action at an appropriate pH.

In the present invention, the pH of the reaction solution is 2 or higher. If the pH is lower than 2, not only is the remarkable effect of the present invention hard to achieve, but also the components in the reaction solution erode the surfaces of the recording apparatus members, such as the tank and the roller, and components of the members elute in the reaction solution, which will affect the image quality. In addition, in the present invention, the pH of the reaction solution is maintained preferably at pH 2 to 7, more preferably at 3 to 6. Within this pH range, the polyvalent metal ion can exist in the reaction solution more stably, thus both the sufficient reactivity of the reaction solution, and a sufficient buffering action can be achieved, maintaining long-term storage stability of the reaction solution.

Furthermore, in the present invention, it is more preferable that the pH of the reaction solution is lower than the pH of the ink, because the reaction between the ink and the reaction solution more effectively proceeds, resulting in improvement in uniformity of solid image and prevention of strike-through of printed matters.

<Aqueous Medium>

The reaction solution of the present invention is made by dissolving or dispersing the above described components in an aqueous medium, but a mixed solvent of water and a water-soluble organic solvent is usually used. For the water-soluble organic solvent, those having the effect of preventing the reaction solution from drying are especially preferable. Specific examples include alkyl alcohols having 1 to 4 carbon atoms such as methyl alcohol, ethyl alcohol, n-propyl alcohol, isopropyl alcohol, n-butyl alcohol, sec-butyl alcohol and tertbutyl alcohol; amides such as dimethylformamide and dimethylacetamide; ketones or ketoalcohols such as acetone and diacetone alcohol; ethers such as tetrahydrofuran and dioxane, alkylene diols such as 1,2-hexanediol; polyalkylene glycols such as polyethylene glycol and polypropylene glycol; alkylene glycols of which the alkylene group has 2–6 carbon atoms such as ethylene glycol, propylene glycol, butylene glycol, triethylene glycol, 1,2,6-hexanetriol, thiodiglycol, hexylene glycol and diethylene glycol; lower alkyl ether acetates such as polyethyleneglycol monomethyl ether acetate; glycerin; lower alkyl ethers of polyhydric alcohols such as ethyleneglycol monomethyl (or ethyl) ether, diethyleneglycol methyl(or ethyl) ether, and triethyleneglycol monomethyl (or ethyl) ether; polyhydric alcohols such as trimethylolpropane and trimethylolethane; N-methyl-2-pyrrolidone, 2-pyrrolidone, 1,3-dimethyl-2-imidazolidinone. A water-soluble organic solvent, as listed above, can be used alone or as a mixture. As water, demineralized water is preferably used.

The content of water-soluble organic solvent contained in the reaction solution is not specifically limited, but is preferably in the range of 3 to 70% by weight based on the total amount of reaction solution. In addition, the content of water contained in the reaction solution is preferably in the range of 25 to 95% by weight based on the total amount of reaction solution.

<Other Components of Reaction Solution>

The reaction solution of the present invention may contain components described below in addition to the components described above.

<Polymer Compounds>

The reaction solution of the present invention may further contain a polymer compound to improve abrasion resistance of the recorded matter. According to studies by the inventors, when the reaction solution contains a polymer compound, the change in pH of the reaction solution may become more significant. It is considered that oxidization of the polymer compound affects the pH of the reaction solution as in the case of oxidization of the organic solvent. Thus, if the reaction solution contains a polymer compound, it is very effective for the solution to have the above-described buffering action. That is, the buffering action of the reaction solution according to the present invention is more effective when the reaction solution contains not only the polyvalent metal ion for ink-destabilization but also a polymer compound for the purpose of improving image fastness of the recorded image than when the reaction solution contains only the polyvalent metal ion.

The polymer compound for use in the reaction solution of the present invention is preferably a nonionic water-soluble polymer that does not affect directly the reaction between the ink component such as the coloring material and the polyvalent metal ion in the reaction solution. Specific examples include, but are not limited to, polyacryl amide, polyvinyl pyrolidone, water-soluble cellulose such as carboxymethyl cellulose, hydroxymethyl cellulose and hydroxypropyl cellulose, and resins such as polyvinyl methyl ether, polyvinyl acetal and polyvinyl alcohol, for example. It is possible to use a polymer having an anion unit or cation unit added to such a nonionic polymer as long as the ink and the reaction solution can retain their respective essential performance in image formation. Furthermore, the above described polymer compound is ideally a water-soluble polymer, but may be a dispersion such as a latex or emulsion.

The addition amount of a polymer compound listed above is preferably 0.01 to 20% by weight based on the total amount of reaction solution. That is, when the amount of polymer compound is 0.01% or greater, the polymer compound can contribute to improvement of abrasion resistance and fixation properties of the ink in image formation. In addition, when the amount of polymer compound is within the range described above, the viscosity of the reaction solution would not become too high.

In addition, a surfactant, an anti-foam agent, an anti-mold agent, a preservative and the like may be added to the reaction solution of the present invention to provide the reaction solution with required properties.

Surfactants that can be added in this case include anionic surfactants such as fatty esters, higher alcohol sulfates, liquid fatty oil sulfates and alkyl allyl sulfonates, and nonionic surfactants such as polyoxyethylene alkyl ethers, polyoxyethylene alkyl esters, polyoxyethylene sorbitan alkyl esters, acetylene alcohol and acetylene glycol, and one type or two or more types thereof may be selected and used. The amount of the surfactant to be used is preferably 0.01 to 10% by weight based on the total amount of the reaction solution, depending on the polymer compound or the like to be incorporated. In this case, the amount of surfactant to be added is preferably determined so that the surface tension of the reaction solution is 20 dyne/cm or more. This is because if the surface tension of the reaction solution is smaller than this value, undesirable situations such as distorted print due to wetting of the nozzle tip (shifts of landing points of the liquid droplets) are caused when the reaction solution is applied by inkjet printing.

Since the reaction solution of the present invention described above is used with an ink for image formation, it is preferable that the reaction solution contains no coloring material, and is a colorless solution having no absorption in a visible range in consideration of influences on the image. However, the reaction solution does not necessarily conform to this requirement, and a lightly colored solution having an adsorption in a visible range may be used as long as the actual image is not influenced.

[Ink]

The reaction solution of the present invention having the composition described above is used with at least one ink for image formation. Particularly, the reaction solution is used for recording in combination with an ink containing a coloring material dispersed or dissolved in an aqueous medium by the action of ionic groups, whereby the previously described preferable effect is achieved in inkjet recording. Inks suitably used in the present invention include pigment inks using pigments as coloring materials (micro-capsulated pigments, colored resins and the like are also categorized as pigments in this application). Particularly, when the reaction solution of the present invention is used for image formation with a pigment ink wherein a pigment is dispersed stably in an aqueous medium by the action of ionic groups, the coloring material agglomerates on the recording medium to form a high quality image. Thus, coloring materials constituting the pigment ink for use in the present invention include a pigment having anionic groups chemically bound on the surface, and a composition of a pigment as a coloring material and an anionic dispersant. Components such as pigments and the aqueous medium constituting the ink will be described in detail below.

<Pigments>

Pigments capable of being used in the present invention include, for example, carbon black and organic pigments.

<Carbon Black>

As carbon black, a carbon black pigment such as furnace black, lampblack, acetylene black or channel black can be used: examples of which include Raven 7000, Raven 5750, Raven 5250, Raven 5000, Raven 3500, Raven 2000, Raven 1500, Raven 1250, Raven 1200, Raven 1190ULTRA-II, Raven 1170, Raven 1255 (manufactured by Columbian Chemicals Company); BlackPearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400 and Vulcan XC-72R (manufactured by Cabot Corporation); ColorBlack FW1, ColorBlack FW2, ColorBlack FW2V, Color Black FW18, Color Black FW200, Color Black S150, Color Black S160, Color Black S170, Printex 35, Printex U, Printex V, Printex 140U, Printex 140V, SpecialBlack 6, SpecialBlack 5, SpecialBlack 4A and SpecialBlack 4 (manufactured by Degussa AG); and No. 25, No. 33, No. 40, No. 47, No. 52, No. 900, No. 2300, MCF-88, MA600, MA7, MA8 and MA100 (manufactured by Mitsubishi Chemical Corporation). However, carbon black is not limited thereto, but well known carbon black can be used. Further, magnetic microparticles such as magnetite and ferrite as well as titanium black or the like may also be used as a black pigment.

<Organic Pigment>

Organic pigments include, for example, insoluble azo pigments such as Toluidine Red, Toluidine Maroon, Hansa Yellow, Benzidine Yellow and Pyrazolone Red; soluble azo pigments such as Lithol Red, Helio Bordeaux, Pigment Scarlet and Permanent Red 2B; derivatives from vat dyes such as Allizarine, Indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange, and Benzimidazolone Red; Pyranthrone pigments such as Pyranthrone Red and Pyranthrone Orange; indigo pigments; condensed azo pigments; thioindigo pigments; and other pigments such as Flavanthrone Yellow, Acylamide Yellow, Quinophtharone Yellow, Nickel Azo Yellow, Copper Azomethine Yellow, Perynone Orange, Anthrone Orange, Dianthraquinonyl Red and Dioxadine Violet.

Examples of organic pigments represented by color index (C. I.) numbers include C. I. Pigment Yellow 12, 13, 14, 17, 20, 24, 74, 83, 86, 93, 109, 110, 117, 120, 125, 137, 138, 147, 148, 151, 153, 154, 166, and 168; C. I. Pigment Orange 16, 36, 43, 51, 55, 59, and 61; C. I. Pigment Red 9, 48, 49, 52, 53, 57, 97, 122, 123, 149, 168, 175, 176, 177, 180, 192, 215, 216, 217, 220, 223, 224, 226, 227, 228, 238, and 240; C. I. Pigment Violet 19, 23, 29, 30, 37, 40, and 50; C. I. Pigment Blue 15, 15:3, 15:1, 15:4, 15:6, 22, 60, and 64; C. I. Pigment Green 7 and 36; and C. I. Pigment Brown 23, 25, and 26. Of course, well known organic pigments other than those listed above can be used.

<Dispersants>

When the carbon black or organic pigment described above is used, a dispersant is preferably used. For the dispersant, a dispersant capable of dispersing the above pigment in an aqueous medium by action of an anionic group is suitable. Specific examples of dispersants include, for example, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrerie-methacrylic acid-alkyl acrylate copolymers, styrene-maleic acid half ester copolymers, vinyl naphthalene-acrylic acid copolymers, vinyl naphthalene-maleic acid copolymers, styrene-maleic anhydride-maleic acid half ester copolymers and salts thereof.

In addition, the weight average molecular weight for these dispersants is preferably in the range of 1,000 to 30,000, especially preferably 3,000 to 15,000.

In addition, the acid value of the dispersant is preferably 300 mg KOH/g or less in view of compatibility between the reliability of the ink, such as the discharge stability and storage stability, and the reactivity with the reaction solution. The acid value of the dispersant is more preferably 100 mg KOH/g to 300 mg KOH/g. In addition, the amount of dispersant added is preferably 0.1 to 3-fold based on the content (wt %) of the coloring material in the ink for the same reason as with the acid value, and is more preferably 0.2 to 2-fold. If the acid value of the dispersant or the addition amount of the dispersant is increased in view of reliability of the ink, the ink tends to become more stable to the reaction solution. In this case, a sufficient level of image performance can be achieved by increasing the amount of polyvalent metal ion in the reaction solution, which, however, may cause a pH drop in the reaction solution. Therefore, it is preferable that the amount of a substance having a buffering action is also increased as required.

<Self-Dispersing Pigment>

In the present invention, the pigment may be a self-dispersing pigment, a pigment dispersed in an aqueous medium without using a dispersant, which is obtained by binding an ionic group (anionic group) to the surface of the pigment. One example of such a pigment is self-dispersing carbon black. Self-dispersing carbon black is, for example, carbon black having an anionic group bound on its surface (anionic carbon black). The self-dispersing pigment will be described below using carbon black as an example.

<Anionic Carbon Black>

Anionic carbon black is carbon black having bound on the surface thereof at least one anionic group selected from —COO(M2), —SO$_3$(M2), —PO$_3$H(M2) and —PO$_3$(M2)$_2$. In the above formula, M2 represents a hydrogen atom, alkali metal, ammonium or organic ammonium.

Among them, in particular, anionically charged carbon black having —COO(M2) or —SO$_3$(M2) on its surface is excellent in dispersibility in the ink, and therefore can be especially suitably used in the present invention. Specific Examples of alkali metals of those expressed by "M2" in the above hydrophilic groups include, for example, Li, Na, K, Rb and Cs. In addition, specific examples of organic ammonium include, for example, methyl ammonium, dimethyl ammonium, trimethyl ammonium, ethyl ammonium, diethyl ammonium, triethyl ammonium, methanol ammonium, dimethanol ammonium and trimethanol ammonium.

If an ink containing self-dispersing carbon black having ammonium or organic ammonium as M2 is used, water resistance of recorded images can be further improved, and the ink is especially suitable in this respect. This is considered ascribable to decomposition of ammonium and evaporation of ammonia when the ink is applied on a recording medium. Here, the self-dispersing carbon black having ammonium as "M2" is obtained by replacing alkaline metal M2 of a self-dispersing carbon black with ammonium by an ion exchange method, or by a method where an acid is added to convert "1M2" into an H type, and then ammonium hydroxide is added to convert "M2" into ammonium, for example.

Other methods for producing anionically charged self-dispersing carbon black include, for example, a method in which carbon black is oxidization-treated with sodium hypochlorite. For example, a —COONa group can be chemically bonded to the surface of carbon black by this method.

A variety of hydrophilic groups described above may be bound directly to the surface of the carbon black. Alternatively, the hydrophilic group may be bound indirectly to the surface of carbon black with another atomic group existing between the surface of carbon black and the hydrophilic group. Here, specific examples of other atomic groups include, for example, straight-chain or branched alkylene groups each having 1 to 12 carbon atoms, substituted or unsubstituted phenylene groups and substituted or unsubstituted naphthylene groups. Here, substituent groups of the phenylene group and the naphthylene group include, for example, straight-chain or branched alkyl groups each having 1 to 6 carbon atoms. In addition, specific examples of combinations of other atomic groups and hydrophilic groups include, for example, —C$_2$H$_4$COO(M2), -Ph-SO$_3$(M2) and -Ph-COO(M2) (Ph represents a phenyl group).

In the present invention, two or more types may be selected as appropriate from the above described types of self-dispersing carbon black for use in the coloring material of the ink. In addition, the amount of self-dispersing carbon black added in the ink is preferably in the range of 0.1 to 15%, especially preferably 1 to 10% by weight based on the total amount of ink. By keeping the amount of self-dispersing carbon black in this range, the self-dispersing carbon black can be kept in an adequate dispersed state in the ink. Furthermore, for the purpose of adjusting the color tone of the ink, a dye may be added as a coloring material in addition to self-dispersing carbon black.

<Colored Fine Particles/Micro-Capsulated Pigments>

Besides those described above as coloring materials, pigments micro-capsulated with polymers and the like, colored fine particles with a coloring material covering the resin particles, and the like may be used. As for the microcapsule, it essentially has dispersibility in an aqueous medium, but the dispersant described above may be made to coexist in the ink for improving dispersion stability. In addition, if colored fine particles are used as a coloring material, the above described anionic dispersant or the like is preferably used.

<Aqueous Medium>

The aqueous medium for dispersing the above described pigments is not specifically limited, and aqueous media similar to those described as aqueous media for the reaction solution may be used. In addition, when the color ink is applied on the recording medium by the inkjet method (e.g. Bubble Jet® method etc.), the aqueous medium is preferably adjusted to have a viscosity and surface tension desired for the ink so that the ink has excellent inkjet discharge characteristics as described previously. Examples of aqueous media that can be used in inks in the present invention include, for example, water, and mixed solvents of water and water-soluble organic solvents. For the water-soluble organic solvents, those having the effect of preventing the ink from being dried are especially preferable.

Specific examples include alkyl alcohols having 1-4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols of which alkylene group has 2 to 6 carbon atoms such as ethylene glycol, propylene glycol, butyrene glycol, triethylene glycol, 1,2,6-hexanetriol, thiodiglycol, hexylene glycol, and diethylene glycol; lower alkyl ether acetates such as polyethyleneglycol monomethyl ether acetate; glycerin; lower alkyl ethers of polyhydric alcohols such as ethyleneglycol monomethyl (or ethyl) ether, diethyleneglycol methyl (or ethyl) ether and triethyleneglycol monomethyl (or ethyl) ether; polyhydric alcohols such as trimethylolpropane and trimethylolethane; N-methyl-2-pyrrolidone, 2-pyrrolidone, 1,3-dimethyl-2-imidazolidinone. A water-soluble organic solvent, as listed above, can be used alone or as a mixture. Further, demineralized water is preferably used as water.

The amount of a water-soluble organic solvent contained in an ink used in the present invention may be, but is not limited to, preferably 3 to 50% by weight based on the total amount of ink. Further, the amount of water contained in an ink is preferably 50 to 95% by weight based on the total amount of ink. Furthermore, besides the components described above, a humectant may be added as required as a matter of course, and also a surfactant, an anti-foam agent, a preservative, an anti-mold agent and the like may be added for providing an ink having desired properties.

In the present invention, the pH of the ink is preferably 6 to 10, especially preferably 7 to 9. In addition, as described above, in the present invention, it is more preferable that the pH of the reaction solution is lower than the pH of the ink since the reaction between the ink and the reaction solution more effectively proceeds, resulting in improvement of uniformity in solid print and prevention of strike-through in printed matters.

[Ink Set]

The color of the ink when the ink described above is combined with the reaction solution described previously to prepare an ink set of the present invention is not specifically limited, and the ink may have one color selected from, for example, yellow, magenta, cyan, red, green, blue and black. Specifically, a selection may be made from the coloring materials described previously so that the ink has a desired color tone. In addition, the ink that is combined with the reaction solution is not limited to one type, but an aspect in which two or more inks having different colors are combined together to provide an ink set suitable for formation of multicolored images is more preferable. The content of coloring material in each ink may be selected as appropriate so that the ink has excellent inkjet discharge characteristics when used in ink-jet recording, and the ink has a desired color tone and density. As a guide, for example, the content of coloring material is preferably in the range of 1 to 50% by weight based on the total amount of ink. Furthermore, in this case, at least one ink of two or more inks should react with the reaction solution.

For example, as long as there is an ink with a coloring material dispersed in an aqueous medium by the action of an ionic group, other inks may be inks containing dyes as coloring materials and, of course, all inks may be inks with coloring materials dispersed in aqueous media by the action of ionic groups. If the ink set having such a configuration is used, bleeding occurs when inks of different color tones are applied contiguously on the recording medium, which poses a problem when a multicolored image is formed by an inkjet apparatus. More specifically, bleeding posing a problem in the ink-jet multicolored image is especially remarkable between a black ink and other color inks (e.g. at least one ink selected from a yellow ink, a magenta ink, a cyan ink, a red ink, a green ink and a blue ink). Thus, for example, a black ink with a pigment dispersed in an aqueous medium by the action of an ionic group is preferably combined as an ink to be destabilized by the reaction solution of the present invention. Other color inks may be inks with dyes dissolved in aqueous media. Of course, all other inks may be such an ink of which coloring material is dispersed in an aqueous medium by the action of ionic groups and destabilized with the reaction solution, as the black ink described above.

[Recording Method and Apparatus]

The reaction solution of the present invention is used for forming images in combination with an ink that is destabilized by the reaction solution. In the present invention, at least application of the ink is carried out by the ink jet recording system. More specifically, the recording method of the present invention comprises the steps of coating a reaction solution on at least an area of a recording medium on which an ink is to be applied, and then applying the ink on the recording medium with an inkjet system, whereby the coloring agent in the ink is agglomerated or gelated on the recording medium by the action of the reaction solution. Thus high quality images of high density and improved color development performances can be obtained without color bleed, or strike-through of the coloring material to the print backside. That is, in the reaction solution of the present invention, the solution properties are inhibited from changing with time, so that no significant change in reactivity of the reaction solution with the ink is caused when the reaction solution is stored, and the reaction solution causes no problem as to the wetting properties of relevant equipment members, and thus is excellent in storage stability, thus making it possible to obtain high quality images as described above with stability.

The reaction solution of the present invention can be applied onto the recording medium by the inkjet recording system as with the ink itself, or by coating the recording medium with the reaction solution of the present invention on the recording medium using a roller or the like. The latter is preferable because it can be done regardless of discharge properties of the reaction solution.

The amount of reaction solution applied on the recording medium may be adjusted as appropriate depending on the type and quantity of the polyvalent metal ion in the reaction solution as well as the ink to be reacted with the reaction solution, but it is preferably 0.5 $g/m^2$ to 10 $g/m^2$ in view of uniformity of the solid image and fixation characteristics of resulting images of recorded matters. It is further preferably in the range of greater than 2 $g/m^2$ to 5 $g/m^2$.

<Inkjet Recording Apparatus>

FIG. 1 shows one example of the ink-jet recording apparatus.

This image forming apparatus employs a serial-type inkjet recording system, and comprises a recording head 1, a sheet feeding cassette 16 comprised of a sheet feeding tray 17 for feeding a recording medium (hereinafter referred to also as recording paper) 19 and means for coating the reaction solution of the present invention integrally; drive means for making the recording head travel both ways in a direction orthogonal to the direction in which the recording paper is conveyed, and control means for controlling the drive of these elements.

The recording head 1 is mounted on a carriage 2 in such a manner that the face on which ink discharge ports are provided is facing to the platen 11. The recording head 1 comprises the ink discharge ports described above, electrothermal converters (e.g. heat elements) to heat the ink and a substrate supporting them (not shown). Furthermore, the recording head 1 has an ink cartridge installed in a carriage placed in the upper part thereof.

The carriage 2 has the recording head 1 mounted thereon, and can travel both ways along two guide shafts 9 extending in parallel along the width direction of the recording paper 19. In addition, the recording head 1 is driven to discharge ink droplets to the recording paper 19 in synchronization with the carriage traveling both ways to form an image.

The sheet-feeding cassette 16 is detachable from the main body of the image forming apparatus. The sheets of recording paper 19 are stacked on the sheet-feeding tray 17 in the sheet-feeding cassette 16. At the time of sheet feeding, the uppermost sheet is pressed against a sheet-feeding roller 10 by a spring 18 pressing upward against the sheet-feeding tray 17. This sheet-feeding roller 10 is nearly semi-circular in cross section, and rotated by a motor (not shown) to feed only the uppermost recording paper 19 with a separation claw (not shown).

The separately fed recording paper 19 is conveyed along a guide surface 16A of the sheet feeding cassette 16 and a guide surface 27A of a paper guide 27 by the action of a large diameter intermediate roller 12 and a small diameter coating roller 6 pressed against the intermediate roller 12. These guide surfaces are curved in an arc concentric with the intermediate roller 12. Thus, the recording paper 19 is conveyed along these guide surfaces 16A and 27A to reverse its conveyance direction. That is, the printing side of the recording paper 19 faces downward until the recording paper 19 reaches the intermediate roller 12 from the sheet-feeding tray 17, but faces upward when the recording paper 19 faces the recording head 1. Thus, the printing side of the recording paper always faces out of the image forming apparatus.

The reaction solution applying means is provided in the sheet-feeding cassette 16, and comprises a supply tank 22 for supplying a reaction solution 15, rotatably supported supply roller 13, of which the circumferential face is partly dipped in the tank 22, and the coating roller 6, placed parallel to and in contact with the supply roller 13 to rotate in the same direction. Further, the coating roller 6 is arranged in such a manner that its circumferential face is in contact with and parallel to the intermediate roller 12 that conveys the recording paper 19. Thus, when the recording paper 19 is conveyed, the intermediate roller 12 and the coating roller 6 rotate in association with rotation of the intermediate roller 12. As a result, the reaction solution 15 is supplied to the circumferential face of the coating roller 6 by a supply roller 13, and the reaction solution is applied uniformly by the coating roller 6 to the printing side of the recording paper 19 held between the coating roller 6 and the intermediate roller 12.

In addition, the image forming apparatus is provided with a float 14 in the supply tank 22. This float 14 is smaller in specific gravity than the reaction solution 15, and floats on the surface of the reaction solution, thereby enabling the residual amount of reaction solution to be visually checked externally through a level indication window 21 made of a transparent member.

Figure 2:
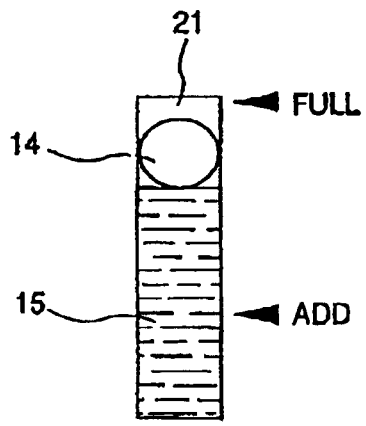
FIG. 2 is a sectional front view of a reaction solution level indicator installed in the ink-jet recording apparatus of the present invention.

FIG. 2 shows a level indicator viewed from the front. In the level indicator, an indicator indicating a level of reaction solution is provided along the long direction of the level indication window 21. In this figure, the tank is full with the reaction solution when the level of the reaction solution or the float 14 reaches the position marked as "Full". On the other hand, if the level of the reaction solution or the float 14 is in the position marked as "Add", it indicates that the level of reaction solution is low. Thus, one can easily know that the reaction solution should be supplied by seeing that the level of the reaction solution 15 gradually drops and the float 14 reaches the Add line.

Figure 3:
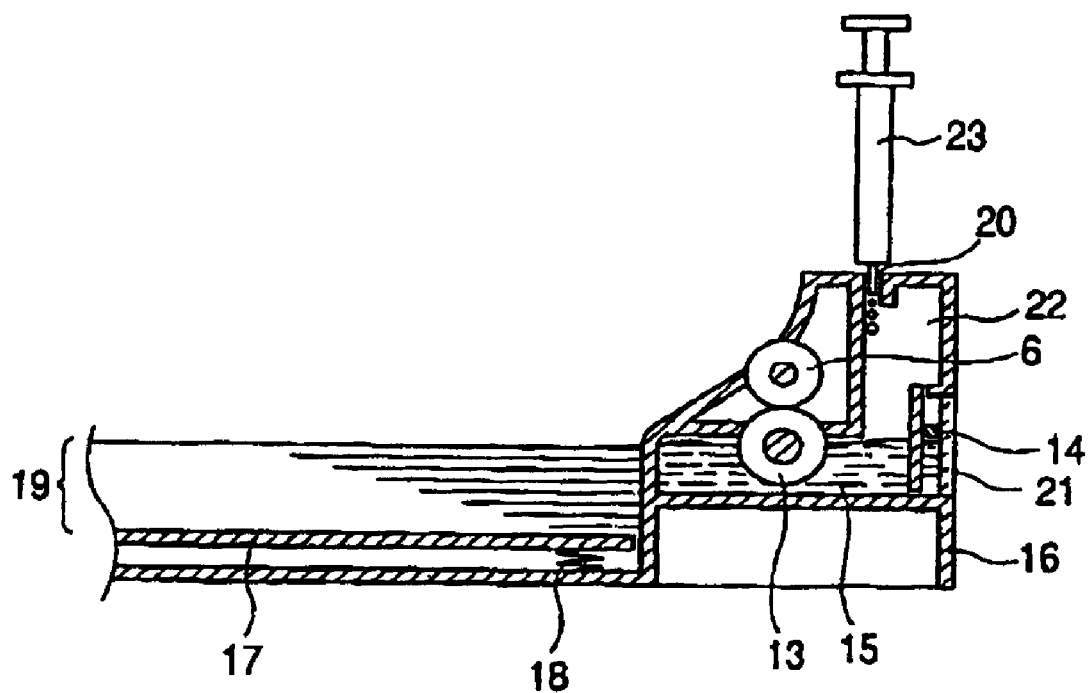
FIG. 3 is a schematic sectional side view showing a reaction solution supply state of the inkjet recording apparatus of the present invention.

To supply the reaction solution, the sheet feeding cassette 16 is pulled out of the main body of the image forming apparatus, and the tip of an injector 23 is inserted into an inlet 20 made of a split-rubber member to inject the reaction solution into the supply tank 22, as shown in FIG. 3.

In this way, the recording paper coated with the reaction solution is then conveyed at a certain speed by a main conveying roller 7 and a pinch roller 8 pressed against the main conveying roller 7 to reach the recording unit, where the ink is applied on the recording paper 19 from the recording head 1. The recording sheet 19 fed and printed in the configuration described above is discharged and conveyed by a sheet discharge roller 3 and a spur 4 pressed against the sheet discharge roller 3, and is then stacked on a sheet discharge tray 5.

In addition, when the reaction solution is applied by a roller etc., it is preferable that the viscosity of the reaction solution is greater than that of the ink in view of effective ink destabilization, the smaller application amount of the reaction solution, and fixability of recorded matters. More specifically, the higher is the viscosity of the reaction solution, the more polyvalent metal ions remain on the upper region of the recording medium, that is, more effective reaction with the ink.

For the ink, on the other hand, quicker solid-liquid separation is preferable in view of fixability. Here the solid-liquid separation means that after the ink reacts with the reaction solution, coloring material in the ink remains on the upper region of the recording medium while the liquid medium such as a solvent or water quickly permeates into the recording medium. Thus, an ink of lower viscosity is more preferable. The viscosity of the reaction solution when the reaction solution is applied by a roller or the like is preferably 3 mPa·s to 100 mPa·s, further preferably 5 mPa·s to 60 mPa·s. The viscosities of the reaction solution and the ink in the present invention can be measured at 25° C. by a conventional method.

On the other hand, when both the ink and reaction solution of the present invention are applied on the recording medium by the inkjet method, there are various possible application orders onto the recording medium as shown below, and any method may be selected as appropriate:

a) The reaction solution is printed, and then the ink is printed;
b) The ink is printed, and then the reaction solution is printed;
c) The ink is printed, then the reaction solution is printed, and then the ink is printed; or
d) The reaction solution is printed, then the ink is printed, and then the reaction solution is printed.

In view of the object of the present invention, the method a) or d) including at least a step of recording the reaction solution on the recording medium prior to the ink is preferable.

Figure 4:
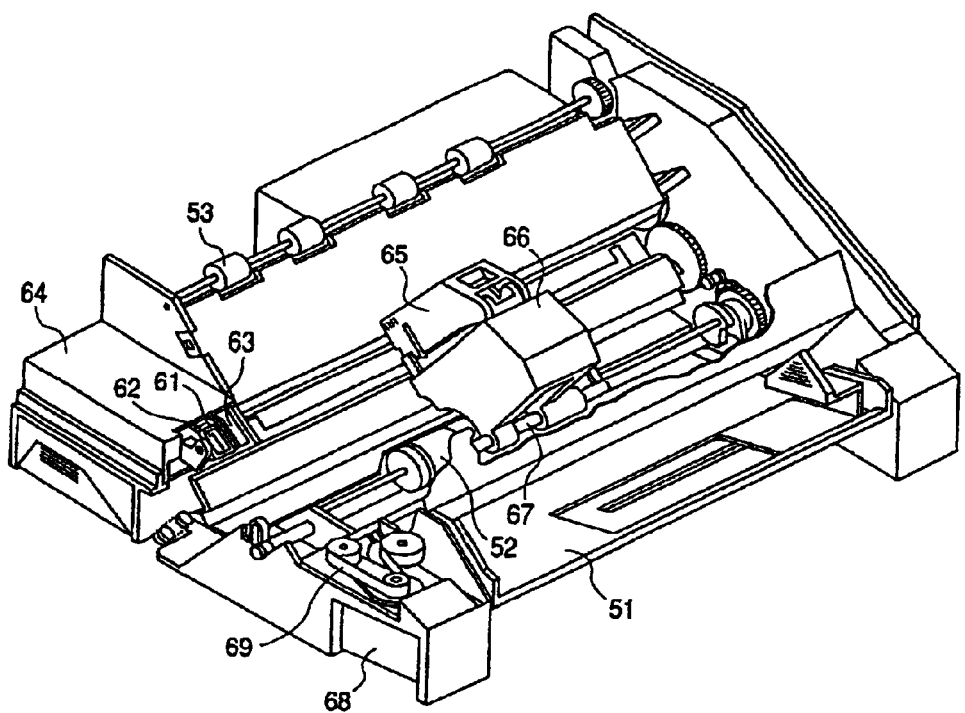
FIG. 4 is a schematic perspective view showing one example of the inkjet recording apparatus of the present invention.

Another example of an inkjet recording apparatus is shown in FIG. 4. In FIG. 4, the blade 61 is a wiping member, one end of which is a fixed end held by a blade-holding member in the form of a cantilever. The blade 61 is provided at a position adjacent to a region in which a recording head 65 operates, and in this example, is held in such a form that it protrudes into the path of the recording head 65.

Reference numeral 62 designates a cap for an ejection opening of the recording head 65, and the cap is arranged in a home position adjacent to the blade 61, moves in the direction perpendicular to the moving direction of the recording head 65, and caps the ink-ejecting opening when touching it. Numeral 63 designates an ink-absorber provided adjacent to the blade 61, which is held in the moving path of the recording head 65 in a projecting form like the blade 61. The above blade 61, cap 62 and ink-absorber 63 constitute an ejection recovery part 64, and the blade 61 and the ink-absorber 63 serve to remove moisture and dust on the ink-ejecting opening.

Reference numeral 65 designates a recording head. The head contains an energy generating means for Ink ejection and performs recording by ejecting ink towards a recording medium opposite to the ink-ejecting opening. Numeral 66 designates a carriage for carrying the recording head 65 to move it. The carriage 66 is engaged with a guide shaft 67 in a slidable manner, and a part of the carriage 66 is connected to a belt 69 (not shown in the figure) driven by a motor 68. Thus the carriage 66 can move along the guide shaft 67, and the recording bead 65 can move in the recording region and the region adjacent thereto. Reference numeral 51 designates a recording medium feeding part for inserting a recording medium and numeral 52 designates a paper-delivery roller driven by a motor not shown in the figure.

With such an arrangement, the recording medium is fed to the position opposite to the ink ejecting opening of the recording head 65 and conveyed to a paper output portion provided with a paper output roller 53 as recording proceeds. In the above arrangement, while the recording head returns to its home position after recording, the cap 62 of the ejection recovery part 64 recedes from the moving path of the recording head, but the blade 61 is projecting in the moving path. As a result, the ink ejecting opening of the recording head 65 is wiped. When the cap 62 comes into contact with the ejection opening face of the recording head 65 to cap it, the cap 62 moves so as to protrude into the path of motion of the recording head 65. When the recording head 65 is moved from its home position to the position at which recording is started, the cap 62 and the blade 61 are at the same positions as the wiping position as described above. As a result, the ejection opening of the recording head 65 is also wiped at the time of this movement.

The above movement of the recording head 65 to its home position is made not only when the recording is completed or for ejection recovery, but also when the recording head 65 is moving in the recording region for recording, that is, it moves to the home position adjacent to the recording region at given intervals during recording, so as to wipe the ejection opening face with this movement.

<Ink Properties: Inkjet Discharge Properties, Permeability to Recording Medium>

The ink set according to the present invention is especially suitable for inkjet recording. Ink-jet recording methods include a recording method in which mechanical energy is exerted on the ink to discharge liquid droplets, and a recording method in which heat energy is applied to the ink to foam the ink to discharge liquid droplets, and not only the ink of the present invention but also the reaction solution can be discharged by these recording methods. In this case, the reaction solution and the ink having configurations according to the present invention described above are preferably capable of being discharged from an inkjet head. For the properties of these solutions, it is preferable that, for example, the viscosity is 1 to 15 mPa·s, and the surface tension is 25 mN/m (dyne/cm) or greater, and it is especially preferable that the viscosity is 1 to 5 mPa·s, and the surface tension is 25 to 50 mN/m (dyne/cm) in view of dischargeability from the ink-jet head. Furthermore, since the reaction solution of the present invention should react with only a specific ink on a recording medium such as paper, it is preferable that the surface tension of the reaction solution is within a range allowing the reaction solution to be discharged from the ink-jet head, and is also greater than that of the ink to be destabilized by the reaction solution so that the reaction solution does not spread to areas other than areas of recording by the ink.

<Ink Cartridge>

Figure 5:
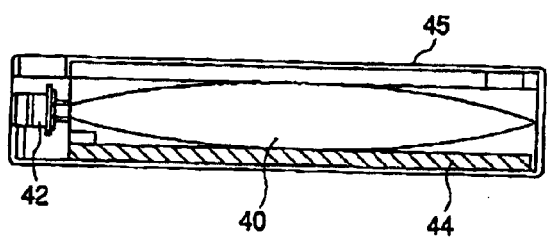
FIG. 5 is a longitudinal sectional view showing one example of an ink cartridge.
Figure 6:
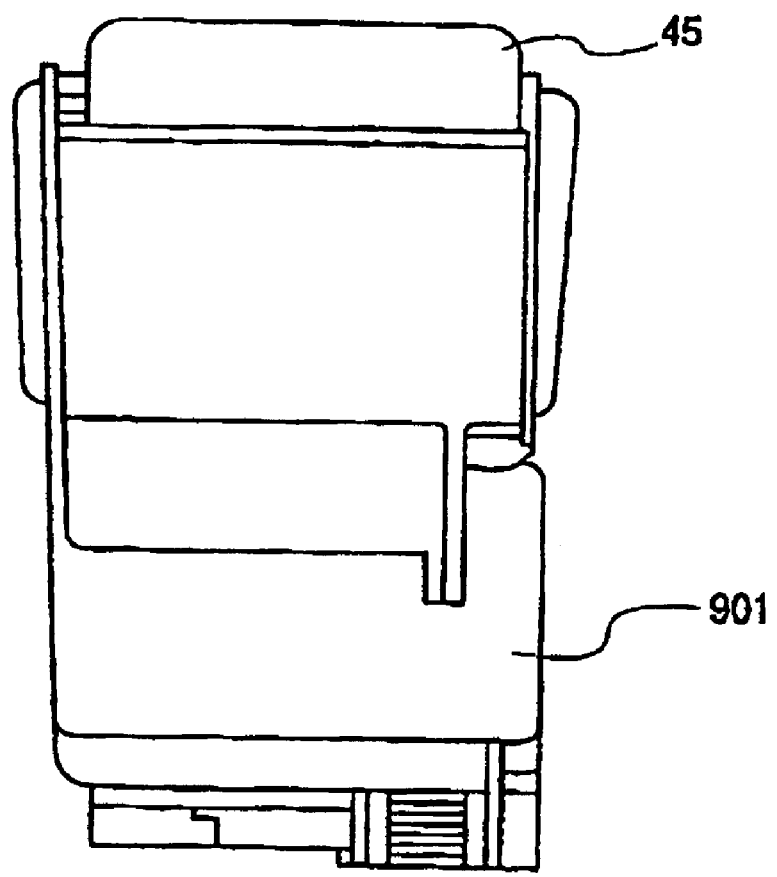
FIG. 6 is a schematic plan view showing a state in which the ink cartridge according to one embodiment of the present invention is installed in a recording head.

FIG. 5 shows one example of an ink cartridge for storing ink for feeding ink to the recording head through an ink feeding member such as a tube. In the drawing, reference numeral 40 denotes a member constituting the ink cartridge 45, an ink storage portion such as an ink bag, whose tip is equipped with a rubber stopper 42. The ink in the ink bag 40 can be fed to the recording head by inserting a needle (not shown in the figure) into the stopper 42. Numeral 44 designates an ink absorber for receiving waste ink. For the ink storage portion, its surface in contact with ink is preferably made of polyolefin, particularly polyethylene. Such a cartridge is configured such that the cartridge can be attached to and detached from a recording head 901 discharging the ink or reaction solution, and the ink or reaction solution is supplied to the recording head 901 when the cartridge 45 is mounted on the recording head.

EXAMPLES

The present invention will now be described more specifically with Examples, but the present invention is not limited to these Examples. Furthermore, "%" means "% by weight" unless otherwise specified.

Reaction solutions 1, 2 and 3 of Examples of the present invention and reaction solutions 4, 5 and 6 of Comparative Examples, of which compositions are shown below, were prepared. Specifically, the components below were mixed and stirred to be dissolved, and then the solution was filtered under pressure through a microfilter of 0.2 μm pore size (manufactured by Fuji Photo Film Co., Ltd.) to prepare respective reaction solutions.

The pH and viscosity of each reaction solution and ink were measured at 25° C. by using a pH meter (pH METER F-21 manufactured by HORIBA Ltd.) and a viscometer (VISCOMETER RE-80L manufactured by Toki Sangyo Co., Ltd.) respectively.

Example 1

| Composition of Reaction Solution 1 | |
| --- | --- |
| aluminum nitrate | 4% |
| potassium acetate | 5% |
| trimethylolpropane | 20% |
| propylene glycol | 20% |
| acetylene glycol/ethylene oxide adduct (trade name: Acetylenol EH) | 1% |
| water | the rest |

The pH of the reaction solution 1 described above was 5.0, and the viscosity was 4.5 mPa·s. When 1.0 ml of a 0.1 N aqueous lithium hydroxide solution was added to 50 ml of this reaction solution, pH was 5.0, showing the buffering action of the reaction solution.

Example 2

| Composition of Reaction Solution 2 | |
| --- | --- |
| calcium nitrate | 3% |
| potassium acetate | 2% |
| acetic acid | 2% |
| trimethylolpropane | 20% |
| propylene glycol | 20% |
| acetylene glycol/ethylene oxide adduct (trade name: Acetylenol EH) | 1% |
| water | the rest |

The pH of the reaction solution 2 described above was 4.5, and the viscosity was 4.2 mPa·s. When 1.0 ml of a 0.1 N aqueous lithium hydroxide solution was added to 50 ml of this reaction solution, pH was 4.5, showing the buffering action of this solution.

Example 3

| Composition of Reaction Solution 3 | |
|---|---|
| yttrium nitrate | 10% |
| potassium acetate | 1% |
| trimethylolpropane | 20% |
| propylene glycol | 20% |
| acetylene glycol/ethylene oxide adduct (trade name: Acetylenol EH) | 1% |
| water | the rest |

The pH of the reaction solution 3 described above was 4.5, and the viscosity was 5.4 mPa·s. When 1.0 ml of a 0.1 N aqueous lithium hydroxide solution was added to 50 ml of this reaction solution, pH was 4.6, showing the buffering action of this solution.

Comparative Example 1

| Composition of Reaction Solution 4 | |
|---|---|
| aluminum nitrate | 4% |
| trimethylolpropane | 20% |
| propylene glycol | 20% |
| acetylene glycol/ethylene oxide adduct (trade name: Acetylenol EH | 1% |
| water | the rest |

The pH of the reaction solution 4 described above was 1.5, and the viscosity was 4.2 mPa·s. When 1.0 ml of a 0.1 N aqueous lithium hydroxide solution was added to 50 ml of this reaction solution, the pH was 1.6 (very low).

Comparative Example 2

| Composition of Reaction Solution 5 | |
|---|---|
| calcium nitrate | 10% |
| trimethylolpropane | 20% |
| propylene glycol | 20% |
| acetylene glycol/ethylene oxide adduct (trade name: Acetylenol EH) | 1% |
| water | the rest |

The pH of the reaction solution 5 described above was 7.5, and the viscosity was 5.0 mPa·s. When 1.0 ml of a 0.1 N aqueous lithium hydroxide solution was added to 50 ml of this reaction solution, the pH was 8.9, showing that the reaction solution had no buffering action.

Comparative Example 3

| Composition of Reaction Solution 6 | |
|---|---|
| yttrium nitrate | 6% |
| trimethylolpropane | 20% |
| propylene glycol | 20% |
| acetylene glycol/ethylene oxide adduct (trade name: Acetylenol EH) | 1% |
| water | the rest |

The pH of the reaction solution 6 described above was 4.1, and the viscosity was 4.9 mPa·s. The pH when 1.0 ml of 0.1 N aqueous lithium hydroxide solution was added to 50 ml of this reaction solution was 4.7, and it could be thus recognized that the reaction solution had no buffering action.

A black ink of the following composition was prepared as an ink to be used with one of the reaction solutions described above.

<Pigment Dispersion Bk>

10 parts of pigment (carbon black (trade name: Mogul L manufactured by Cabot Co., Ltd.)), 20 parts of anionic polymer P-1 (styrene-acrylic acid copolymer, acid value 200, weight average molecular weight 10,000, aqueous solution with the solid content of 10%, neutralizing agent: potassium hydroxide) and 70 parts of pure water were mixed, and placed in a batch-type vertical sand mill (manufactured by IMEX Co., Ltd.) with 150 parts of zirconia bead of 0.3 mm diameter. The mixture was dispersed for 5 hours while cooling by water. This dispersion was centrifuged to remove coarse particles to obtain a pigment dispersion Bk. The solid content of this Bk was about 12% and the weight average particle size of was 120 mm.

<Ink Composition>

| | |
|---|---|
| Pigment dispersion Bk | 30% |
| Glycerin | 9% |
| Diethylene glycol | 6% |
| Acetylene glycol/ethylene oxide adduct (trade name: Acetylenol EH) | 1% |
| Water | 54% |

The pH of the black ink described above was 7.3, and the viscosity was 2.5 mPa·s.

(1) Evaluation on pH Change with Time for Reaction Solutions

The pH of the reaction solutions of Examples 1–3 and Comparative Examples 1 to 3 was measured before and after storage in a sealed state at 60° C. for one month. The results are shown in Table 1.

(2) Evaluation on Strike-Through

Images were formed with the Black ink above using the reaction solutions of Examples 1 to 3 and Comparative Examples 1 to 3 respectively, and evaluation was made on the strike-through of the coloring material to the back of the print.

First, the reaction solutions were each applied on PPC Paper (manufactured by Canon Inc.). A bar coater was used for the reaction solutions of Examples 1 and 2 and Comparative Examples 1, 2 and 3, and for the solution of Example 3, a coating roller was used. Immediately after coating, a solid print of 2×2 cm square was printed with the black ink using BJS 700 (manufactured by Canon Inc.), and the level of strike-through of the black ink was visually observed from the backside of the print to make evaluations according to the criteria below. The results are shown in Table 1. Images obtained in Examples 1 to 3 had a very high image density.

<Evaluation Criteria for Strike-Through>

A: Almost no ink strike-through was observed.
B: Strike-through was observed to some degree.
C: Strike-through was significant.

TABLE 1

| | Reaction solution No. | Existence/ nonexistence of buffering action | pH of reaction solution | | | Strike- through |
|---|---|---|---|---|---|---|
| | | | Initial stage | After storage | Difference | |
| Example 1 | 1 | Existent | 5.0 | 4.8 | 0.2 | A |
| Example 2 | 2 | Existent | 4.5 | 4.5 | 0.0 | A |
| Example 3 | 3 | Existent | 4.5 | 4.3 | 0.2 | A |

TABLE 1-continued

|  | Reaction solution No. | Existence/ nonexistence of buffering action | pH of reaction solution | | | Strike-through |
|---|---|---|---|---|---|---|
|  |  |  | Initial stage | After storage | Difference |  |
| Comparative Example 1 | 4 | Existent | 1.5 | 1.5 | 0.0 | A |
| Comparative Example 2 | 5 | Not existent | 7.5 | 2.5 | 5.0 | A |
| Comparative Example 3 | 6 | Not existent | 4.1 | 2.0 | 2.1 | A |

Furthermore, the reaction solutions were stored at 60° C. for one month, were used for printing and were evaluated on strike-through in the same manner as above. With the reaction solutions of Examples 1 to 3 and Comparative Example 1, strike-through evaluation was the same before and after the storage, but the level of strike-through was worsened after storage for those of Comparative Examples 2 and 3.

As described above, the present invention provides a reaction solution that can exert its ink-destabilizing ability to the maximum without being affected by the type of polyvalent metal. This makes it possible to provide a reaction solution, a set of a reaction solution and an ink, an inkjet recording apparatus and an image recording method, with which no strike-through of a coloring material to the print backside of a recording medium occurs, high quality images of high density and improved color development performances can be obtained with stability, and with which there are no problems as to storage stability or adverse effects on the members of the recording apparatus.

What is claimed is:

1. A reaction solution for use in image recording in conjunction with an ink containing a coloring material in a dissolved or dispersed state, the reaction solution destabilizing the dissolved or dispersed state of the coloring material in the ink by contact with the ink, the reaction solution comprising:

a polyvalent metal ion;

an organic solvent;

a buffer; and a metal ion derived from the buffer, the reaction solution has a pH of 2 or higher, and has a buffering action for variations in pH, wherein the buffering action means maintaining pH variation within the range of 0.5 before and after the addition of 1.0 ml of a 0.1 N aqueous lithium hydroxide solution to 50 ml of the reaction solution.

2. The reaction solution according to claim 1, wherein the amount of the polyvalent metal ion is from 0.01% to 10% inclusive by weight based on the total amount of the reaction solution.

3. The reaction solution according to claim 1, wherein reaction solution further contains a strong acid ion.

4. The reaction solution according to claim 1, wherein the pH of the reaction solution is 7 or lower.

5. A set of an ink and a reaction solution comprising:

an ink containing a coloring material in a dissolved or dispersed state, and a reaction solution capable of destabilizing the dissolved or dispersed state of the coloring material in the ink by contact with the ink, wherein the reaction solution contains a polyvalent metal ion, an organic solvent, a buffer, and a metal ion derived from the buffer, the reaction solution has a pH of 2 or higher, and has a buffering action for variations in pH, wherein the buffering action means maintaining pH variation within the range of 0.5 before and after the addition of 1.0 ml of a 0.1 N aqueous lithium hydroxide solution to 50 ml of the reaction solution.

6. An inkjet recording apparatus comprising:

a recording head for discharging an ink containing a coloring material in a dissolved or dispersed state;

an ink cartridge having an ink storage unit containing the ink;

ink supply means for supplying the ink from the ink cartridge to the recording head; and means for supplying a reaction solution capable of destabilizing the dissolved or dispersed state of the coloring material in the ink by contact with the ink, wherein the reaction solution contains a polyvalent metal ion, an organic solvent, a buffer, and a metal ion derived from the buffer, the reaction solution has a pH of 2 or higher, and has a buffering action far variations in pH, wherein the buffering action means maintaining pH variation within the range of 0.5 before and after the addition of 1.0 ml of a 0.1 N aqueous lithium hydroxide solution to 50 ml of the reaction solution.

7. The inkjet recording apparatus according to claim 6, wherein the amount of the polyvalent metal ion is from 0.01% to 10% inclusive by weight based on the total amount of the reaction solution.

8. The inkjet recording apparatus according to claim 6, wherein the reaction solution further contains a strong acid ion.

9. The inkjet recording apparatus according to claim 6, wherein the pH of the reaction solution is 7 or lower.

10. The inkjet recording apparatus according to claim 6, wherein the pH of the reaction solution is lower than the pH of the ink.

11. The inkjet recording apparatus according to claim 6, wherein the viscosity of the reaction solution is greater than the viscosity of the ink.

12. The inkjet recording apparatus according to claim 6, comprising a coating roller for coating the reaction solution on a recording medium.

13. The inkjet recording apparatus according to claim 12, wherein the amount of the reaction solution applied on the recording medium is from 0.5 $g/m^2$ to 10 $g/m^2$ inclusive.

14. An image recording method comprising:

a step of coating a recording medium with a reaction solution capable of destabilizing the dissolved or dispersed state of a coloring material in an ink by contact with the ink containing the coloring material in a dissolved or dispersed state; and a step of coating the ink on the recording medium by the inkjet method, wherein the reaction solution contains a polyvalent metal ion, an organic solvent, a buffer, and a metal ion derived from the buffer, the reaction solution has a pH of 2 or higher, and has a buffering action for variations in pH, wherein the buffering action means maintaining pH variation within the range of 0.5 before and after the addition of 1.0 ml of a 0.1 N aqueous lithium hydroxide solution to 50 ml of the reaction solution.

15. The image recording method according to claim 14, wherein the amount of the polyvalent metal ion is from 0.01% to 10% inclusive by weight based on the total amount of the reaction solution.

16. The image recording method according to claim 14, wherein the reaction solution further contains a strong acid ion.

17. The image recording method according to claim 14, wherein the pH of the reaction solution is 7 or lower.

18. The image recording method according to claim 14, wherein the pH of the reaction solution is lower than the pH of the ink.

19. The image recording method according to claim 14, wherein the viscosity of the reaction solution is greater than the viscosity of the ink.

20. The image recording method according to claim 14, wherein coating of the reaction solution on the recording medium is carried out by a coating roller.

21. The image recording method according to claim 20, wherein the amount of the reaction solution applied on the recording medium is from 0.5 $g/m^2$ to 10 $g/m^2$ inclusive.

* * * * *

UNITED STATES PATENT AND TRADEMARK OFFICE
CERTIFICATE OF CORRECTION

PATENT NO. : 6,932,465 B2
APPLICATION NO. : 10/661969
DATED : August 23, 2005
INVENTOR(S) : Yasuhiro Nito et al.

It is certified that error appears in the above-identified patent and that said Letters Patent is hereby corrected as shown below:

At [56] References Cited

FOREIGN PATENT DOCUMENTS

"EP    0 739 743 A1    10/1996"    should be deleted.

Column 4

Line 18, "include" should read --include,--
Line 19, "NO$^-$," should read --NO$_3^-$,--.
Line 59, "Ca24 and Cu24," should read -- Ca$^{2+}$ and Cu$^{2+}$, --.

Column 8

Line 55, "styrerie-methacrylic" should read --styrene-methacrylic--.

Column 9

Line 52, " "1M2" " should read --"M2"--.

Column 12

Line 49, "to" should be deleted.

Column 14

Line 63, "Ink" should be --ink--.

Column 17

Line 26, "Acetylenol EH" should read --Acetylenol EH)--.

Column 18

Line 16, "of" should be deleted.

UNITED STATES PATENT AND TRADEMARK OFFICE
CERTIFICATE OF CORRECTION

PATENT NO. : 6,932,465 B2
APPLICATION NO. : 10/661969
DATED : August 23, 2005
INVENTOR(S) : Yasuhiro Nito et al.

It is certified that error appears in the above-identified patent and that said Letters Patent is hereby corrected as shown below:

Column 20

Line 19, "far" should read --for--.

Signed and Sealed this

Nineteenth Day of December, 2006

JON W. DUDAS
*Director of the United States Patent and Trademark Office*